United States Patent [19] [11] 4,301,643
Bailey et al. [45] Nov. 24, 1981

[54] AGRICULTURAL MOWERS

[75] Inventors: Alfred J. Bailey; Malcolm Dean, both of Coventry; Norman J. A. Bruce, Moreton Morrel, all of England

[73] Assignee: Massey-Ferguson Services N.V., Curacao, Netherlands Antilles

[21] Appl. No.: 126,047

[22] Filed: Feb. 29, 1980

[30] Foreign Application Priority Data

Mar. 6, 1979 [GB] United Kingdom ............... 07723/79

[51] Int. Cl.³ ........................................... A01D 55/26
[52] U.S. Cl. ..................................... 56/13.6; 56/17.3; 56/6
[58] Field of Search .......... 56/13.6, 14.2, 4.3, 56/17.3, 312, 314, 320, 6

[56] References Cited

U.S. PATENT DOCUMENTS

| | | | |
|---|---|---|---|
| 249,775 | 11/1881 | Kromer et al. | 56/314 |
| 2,312,785 | 3/1943 | Welty | 56/314 |
| 2,977,741 | 4/1961 | Stroman | 56/13.6 |
| 3,483,685 | 12/1969 | Guillotin | 56/13.6 |
| 4,178,744 | 12/1979 | Allely et al. | 56/13.6 |

Primary Examiner—Robert A. Hafer
Attorney, Agent, or Firm—Robert L. Farris

[57] ABSTRACT

An agricultural mower having a crop cutting rotor that is rotatable about an upright axis and cuts a strip of crop along a cut edge of the crop so as to emerge laterally from said cut edge, and a crop guide that is located adjacent the periphery of the rotor where it emerges from said cut edge of the crop so as to support the crop upright at said edge while it is cut. The guide thereby avoids leaving any uncut lines of crop caused by the rotor pushing crop aside at a cut edge in the crop where it is unsupported by adjacent standing crop. The invention is particularly applicable to a mower with two or more cutting rotors that are rotatable in the same sense about respective upright axes alongside one another with one rotor offset rearwards relative to the other so as to cut crop adjacent a cut edge left by said other rotor, the crop guide being located adjacent the periphery of said one rotor to support the crop along said edge.

6 Claims, 4 Drawing Figures

AGRICULTURAL MOWERS

The invention relates to agricultural mowers having crop cutting rotors which are rotatable about generally upright axes and which are commonly known as rotary mowers.

In U.S. Pat. No. 4,192,123 there is disclosed a mower having three or more rotary cutters, capable of producing a single swath of cut crop laid on the field. The disposition of the rotors in this mower is such that during operation in certain crops, notably those which have stems which allow the crop to sag when neighbouring stems are removed, the mower leaves a narrow strip of imperfectly cut crop behind it. The invention aims to mitigate or eliminate this problem, and is based upon an appreciation of the fact that the problem is caused by a cutter emerging from the edge of the standing crop and pressing the standing stalks towards the adjacent cleared ground.

For example, in the three cutter mowers illustrated in our aforesaid patent application, two of the cutters are mounted abreast of one another and rotate in opposite directions to produce a swath between them, and the third cutter is mounted behind and to one side of the other two cutters so as to overlap the path of advance of the adjacent cutter, and rotates so as to cut the crop and feed it behind said adjacent cutter onto the swath formed between the other two cutters. The third cutter therefore rotates so that it emerges from the edge of the crop formed by the adjacent cutter ahead of it, and thus tends to bend the stalks towards the cleared ground and may fail to cut them if they are not sufficiently stiff.

The invention counters this problem by providing the mower with a crop support adjacent a rotary cutter that emerges from an edge of the crop so that the standing stalks along said edge are supported as they are cut.

Preferably, in a mower with three or more rotary cutters, each supported from below on a ground engaging skid, the crop support is mounted on the skid of an adjacent cutter.

One way of realizing the invention will now be described in detail with reference to the accompanying drawings of which:

Figure 1:
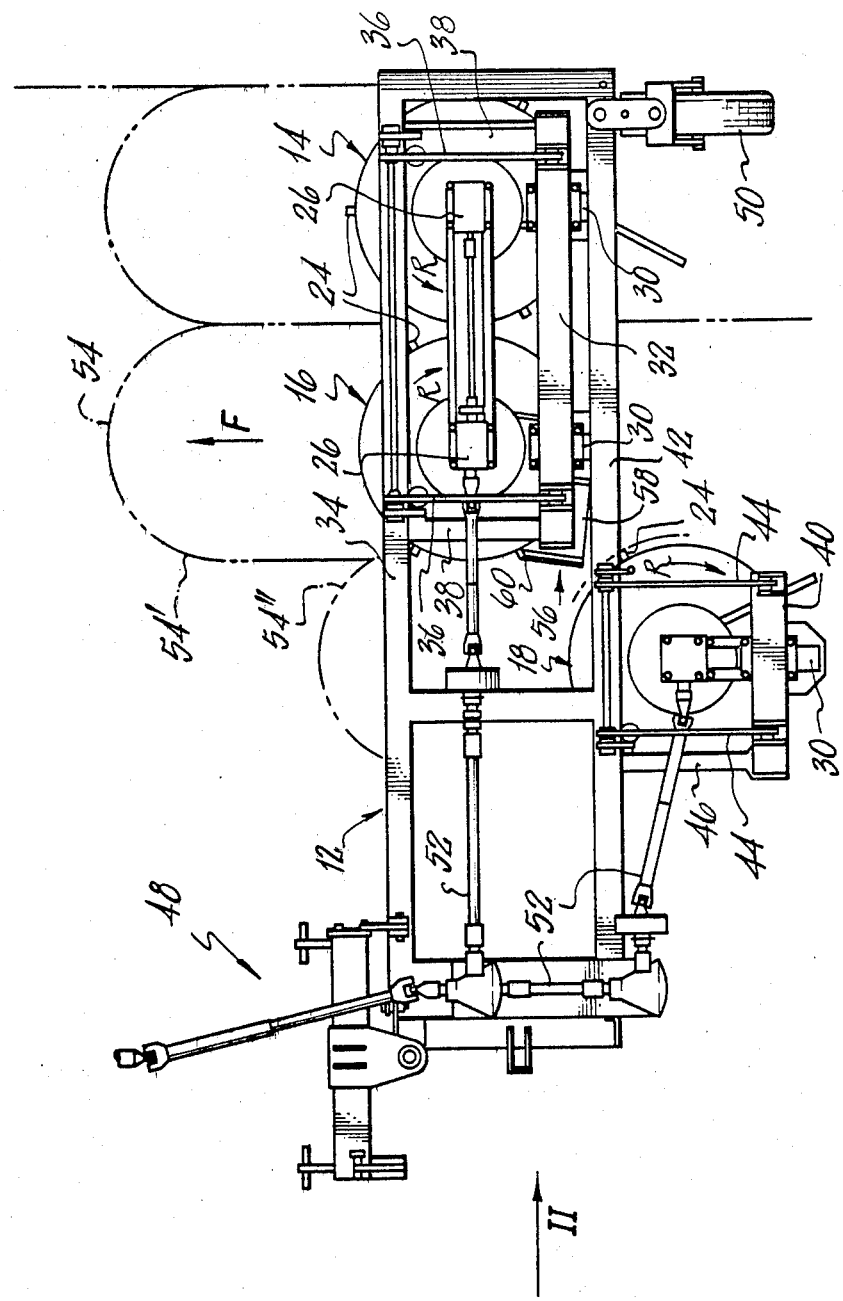
FIG. 1 is a plan view of a three rotor mower.

The mower 10 consists of a rectangular frame 12 upon which are mounted three rotary cutters 14, 16, 18 each consisting of an upright drum, 20 an inverted saucer shaped disc 22 and three freely pivoting blades 24 carried relatively equiangularly on the periphery of the disc 22. Each rotary cutter is driven through its own overhead bevel gear box 26 and is supported from below by a ground engaging skid assembly 28 itself carried from behind by an upwardly extending support leg 30. Each leg 30 is attached to the frame 12 at its upper end via a corssbar and parallelogram linkage. The legs 30 of rotary cutters 14 and 16 are bolted to a crossbar 32 that is connected to the front transverse member 34 of frame 12 by a parallelogram linkage 36/38 so that the cutters 14, 16 can swing up and down behind said frame member 34. The leg 30 of rotary cutter 18 is bolted to a crossbar 40 that is connected to the rear transverse member 42 of frame 12 by a parallelogram linkage 44/46 so that the cutter 18 is located behind and to one side of the cutters 14, 16 and can swing up and down behind the frame member 42.

The mower 10 is coupled to a tractor through a hitch 48 at one end of the frame 12 and is supported on a caster wheel 50 at the other end of the frame. The mower advances in the direction of arrow F in FIG. 1. The cutters 14, 16, 18 are driven by the power take-off of the tractor through a transmission system comprisisng drive shafts 52 and the gearboxes 26, and rotate in the directions shown by the arrows R in FIG. 1. The cutters, 14, 16 rotate in opposite directions with their leading edges moving towards one another and rearwards so as to form a swath therebetween. The cutter 18 rotates so that its leading edge moves towards the adjacent cutter 16 and feeds the crop behind the cutter 16 onto the swath formed between the cutters 14, 16.

The line 54 in FIG. 1 illustrates the profile that will cut in the crop as the mower advances, and shows that the cutter 16 forms a cut edge 54' in the direction of advance F which is subsequently removed by the adjacent trailing cutter 18. As cutter 18 cuts the standing crop along the edge 54', the cutter blades 24 emerge from the crop at the point 54" and tend to press it towards the adjacent cleared space. In order to prevent this portion of the crop from being bent over and imperfectly cut, a crop support 56 is provided ahead of and adjacent the cutter 18 so as to support the crop along the edge 54" as it is cut.

The crop support 56 is carried on the skid assembly 28 of the adjacent cutter 16 and comprises a plate 58 that is bolted to the skid assembly so as to project substantially horizontally towards the cutter 18, and that has an upstanding support wall 60 along an outer edge in substantial alignment with the edge 54' of the cut crop. Bolts 62 connect the support 56 to the skid assembly via elongate arcuate slots 64 in the plate 58 so as to allow adjustment of the orientation of the support wall 60 relative to the edge 54'. In fact, the slots 64 are arranged such that the rear end of the wall 60 adjacent the trailing cutter 18 moves in an arc 66 centred on the axis of rotation of cutter 18 as it is adjusted. This ensures that the rear end remains close enough to the cutter 18 to support the crop in all positions. Typically, the spacing between the end of the support wall 60 and the trailing cutter is ⅝ inch. Preferably, the support 56 is adjusted so that the wall 60 is directed longitudinally at a slight angle to the edge 54' so that its outer face presses the crop slightly towards the cutter 18 as it moves forwards.

Figure 2:
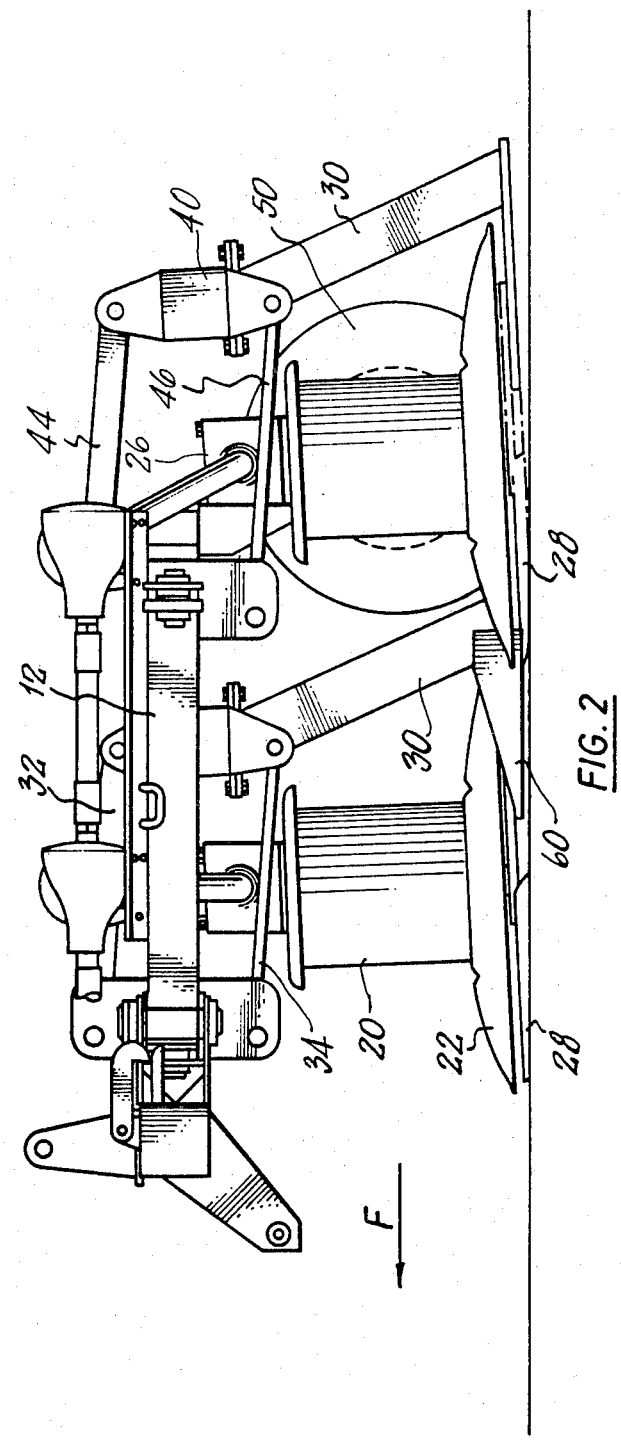
FIG. 2 is an elevation viewed in the direction of arrow II in FIG. 1.
Figure 3:
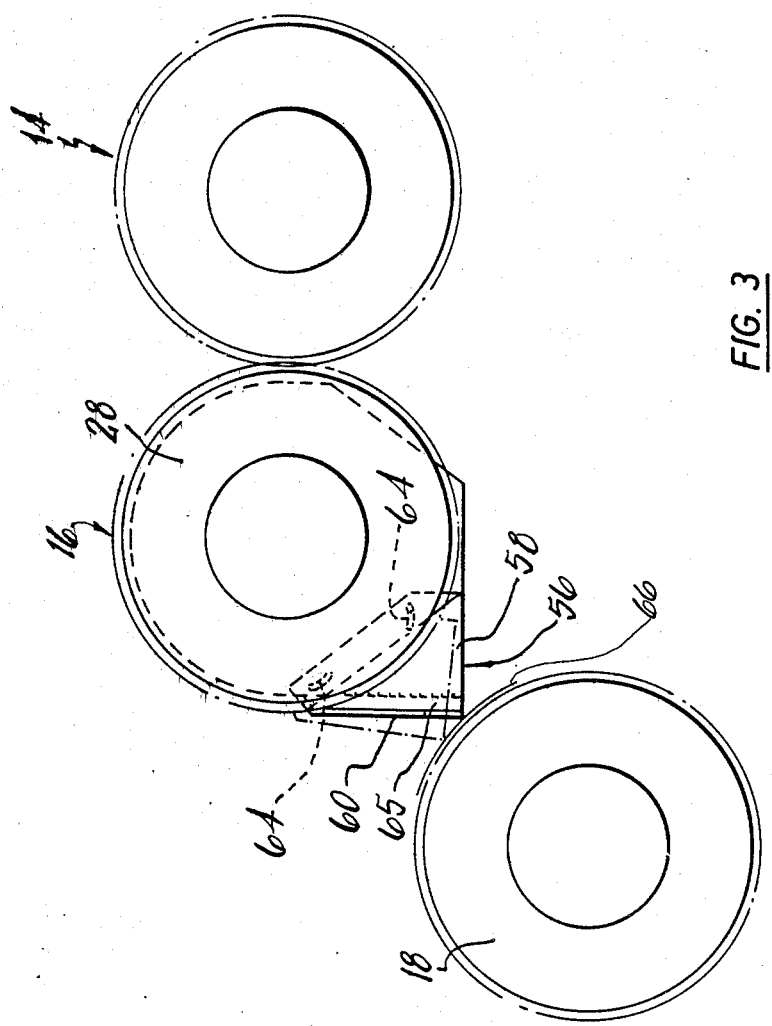
FIG. 3 is a plan view of the skid fitted with the guide in FIGS. 1 and 2.
Figure 4:
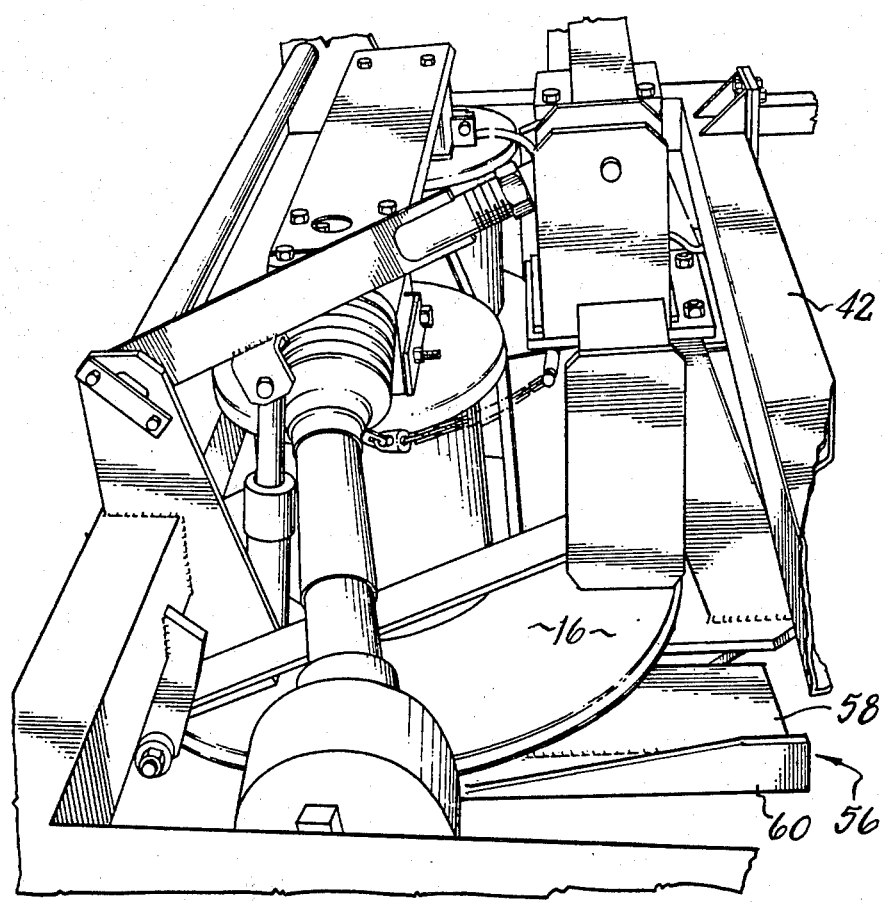
FIG. 4 is a side view of the rotor and skid looking in the general direction of arrow II in FIG. 1.

The wall 60 is itself formed by one wall of an elongate L-section member that is welded via its other wall 65 to the plate 58. The wall 60 decreases in height in the forwards direction F (FIG. 2) so that the wall progressively engages and supports the crop along the edge 54' as the mower advances. At the moment when the crop is cut at the point 54", it is supported against the full-height tail end of the wall 60 so that it is cut cleanly and is not pushed sideways into the adjacent cleared ground space.

It will be appreciated that in an alternative mower similar to that illustrated but having a second trailing cutter spaced apart from the trailing cutter 18 on the other side of the two leading cutters 14, 16, a separate crop support may be provided on the skid assembly 28 of the cutter 14.

We claim:

1. An agricultural mower having a frame, at least one forward rotary cutter supported from below on a skid assembly suspended from the frame, at least one rear rotary cutter supported from below on a skid assembly suspended from the frame so that in operation the rear rotary cutter is to the rear and to one side of the forward rotary cutter, drive means mounted on the frame for rotating each rotary cutter about a generally vertical axis, and a crop guide secured to the skid assembly supporting the forward rotary cutter including a support wall the rear portion of which is adjacent to the rear rotary cutter, the support wall being operable to support uncut crop material so that the rear rotary cutter can cut the supported uncut crop material adjacent the ground.

2. The agricultural mower of claim 1 including adjustment means to adjust the position of the crop guide relative to the rear rotary cutter.

3. The agricultural mower of claim 1 wherein each skid assembly is suspended from the frame by linkage members which permit each rotary cutter to float up and down relative to the frame independent of other rotary cutters suspended from the frame.

4. The agricultural mower of claim 3 including adjustment means to adjust the position of the crop guide relative to the rear rotary cutter.

5. The agricultural mower of claim 2 wherein the adjustment means includes slots which allow the rear portion of support wall of the crop guide to be moved in an arc centered on the axis of rotation of the rear rotary cutter.

6. the agricultural mower of claim 1 wherein the support wall of the crop guide increases in height from front to rear.

* * * * *